Dec. 25, 1928.
J. V. O. PALM
1,696,410
THERMOSTAT CONTROL VALVE FOR COOLING SYSTEMS
Filed March 5, 1923
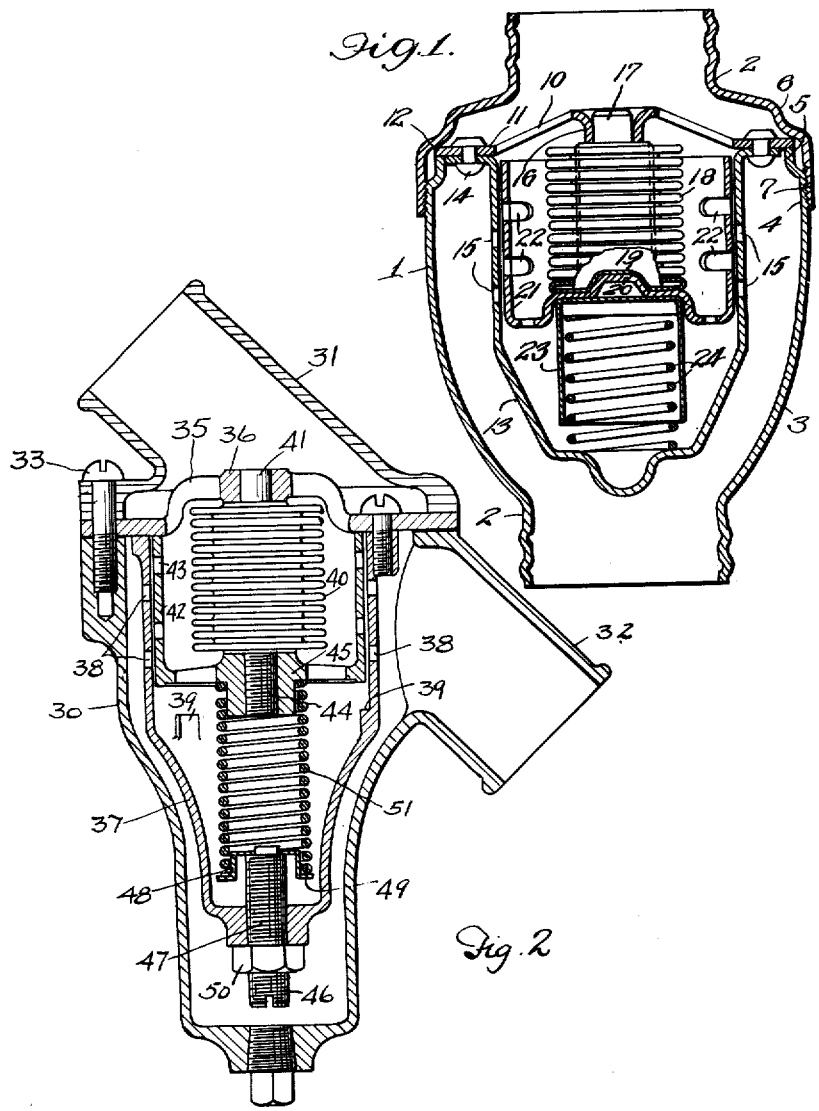
INVENTOR.
John V. O. Palm
BY
Fay, Oberlin & Fay
ATTORNEYS Patented Dec. 25, 1928.

1,696,410

UNITED STATES PATENT OFFICE.

JOHN V. O. PALM, OF CLEVELAND, OHIO, ASSIGNOR, BY MESNE ASSIGNMENTS, TO THE BISHOP & BABCOCK MANUFACTURING COMPANY, OF CLEVELAND, OHIO, A CORPORATION OF OHIO.

THERMOSTAT CONTROL VALVE FOR COOLING SYSTEMS.

Application filed March 5, 1923. Serial No. 623,004.

The present invention relates to a control valve for cooling systems and is particularly adapted for automatically controlling the flow of the cooling liquid in the cooling system of an automobile or other internal combustion engine. The present valve is adapted to be placed in the return pipe from the engine to the radiator and is so arranged that it will control the flow and temperature of the cooling liquid.

Other features are the placing of the valve in such a way as to minimize the fluctuations due to the pressure in the cooling system and also the arrangement of parts whereby a normally higher temperature is maintained in summer than in winter, thus keeping the winter temperature below the point where the antifreezing element is boiled away. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a sectional view through the present valve; and Fig. 2 is a similar view through a slightly modified form.

The present valve consists of an outer casing or shell 1 having reduced ends 2 which are threaded or provided with annular ribs for engagement within the hose lines of the cooling system. This casing is in two parts, the lower part 3 forming the body of the shell and being provided with threads 4 adjacent its upper end, the top of the shell being turned in and upwardly to form a shoulder or ring 5 of reduced diameter. The upper portion 6 of the shell or the cover is provided with an interiorly threaded downturned flange 7 adapted to engage over and be secured to the body portion 3.

The automatic valve mechanism is mounted within the casing and comprises a frame or spider 10 having an outer annular imperforate ring 11 mounted on the ring 5 and held in place by a shoulder 12 formed in the cover. To this ring 11 is attached a closed frame or sleeve 13 by means of rivets 14 or in any other suitable manner, such frame 13 forming the outer sleeve of the valve, i. e., one of the flow control elements and being provided with one or a series of spaced aligned valve openings 15. The lower part of the frame 13 is reduced in diameter so as to conform to the general shape of the outer housing. The spider 10 or upper portion of the valve frame is provided with a depending supporting ring or bushing 16 into which is inserted the extending pin 17 of a temperature responsive element, herein shown in the form of a bellows member 18 and the bottom of the bellows is recessed at 19 to receive a complementary shaped bottom 20 of the slidable sleeve member 21 forming the second flow control element of the valve, this slidable member being provided with spaced aligned ports 22 corresponding to and adapted in one position of the sleeve to register with the openings 15. The top of this sleeve 21 is open and acts as the outlet for the valve.

On the underside of the bottom 20 of the movable sleeve 21 is mounted a cup or cylinder 23 open at its lower end and in this cup is mounted a coil spring 24 resting on the bottom of the sleeve 13 thus placing the bellows under a predetermined pressure and maintaining the valve in its normally closed position.

The two sleeves 13 and 21 may be spaced slightly apart so as to allow a predetermined amount of leakage through the valve at all times allowing the cooling liquid to fill up the inner movable sleeve so that a balanced valve is obtained.

The bellows or control member contains a thermosensitive liquid and is filled so as to open the valve at a predetermined temperature which may be varied by either changing the amount of such fluid or by changing the spring pressure.

In the usual form of valve for use in automobile cooling systems, the valve is placed in the upper hose line with the cover toward the radiator, thus the bellows is mounted in the low pressure side of the line and a normal spring pressure of 10 lbs. is used. The present valve is set to normally begin to open at 150° F. and the bellows member will operate to begin to register the ports in the two sleeves at this temperature and to fully open the valve at approximately 170° F. The spring pressure, of course, increases with the opening of the valve and at its full open position the spring exerts about twelve and three quarters pounds pressure.

This increase of spring pressure is important as the valve operates so as to maintain the cooling liquid at a lower normal temperature in winter than in summer. As the radiator or cooler is subjected to lower temperatures and as its capacity is so large that in cold weather it would normally keep the water below 150° F. the tendency of the valve is to allow sufficient circulation to maintain only this temperature. In the summer time, however, the temperature rises rapidly and the valve will open completely at 170° so that it in no way affects the capacity of the cooling system.

This is important as most automobile cooling systems are filled in the winter with a mixture of alcohol and water and if the temperature is raised much over 150° F. the alcohol is quickly boiled out of the system and the freezing temperature of the cooling liquid raised. With the present valve the normal winter running temperature is low enough to reduce such boiling and the cooling liquid is thus kept fairly constant avoiding freezing and consequent troubles.

In Fig. 2 a modified form of valve is shown in which the casing 30 holding the valve mechanism is at an angle to the end pipes 31 and 32 which are connected in the hose line. Here the cover forms the outlet pipe 31 while the casing 30 is formed integrally with the pipe 32, the two being secured together by screws 33. Similarly, as in the preferred form the casing 30 supports a spider or frame 35 having a central boss 36 and a fixed outer sleeve member 37 having valve ports 38 and being provided with stops 39. The bellows 40 has its pin 41 mounted in the boss and is attached at its other end to the movable sleeve 42 having ports 43. The bellows has an extending threaded pin 44 engaging in a complementary threaded aperture in a central boss 45 on the bottom of the movable sleeve.

The fixed sleeve has a bolt 46 adjustably mounted through an aperture 47 in its bottom, the bolt being provided with an inverted cup 48 having a radially extending flange 49. A coil spring 51 is mounted between this cup and the boss on the movable sleeve to normally place the bellows under the predetermined pressure and the pressure may be varied by changing the position of the bolt 46 and inverted cup which is held in adjusted position by a lock nut 50. The two sleeves are spaced so as to give a normal predetermined leakage to prevent pressure from building up in the system and as in the other form the bellows is on the low pressure side of the line.

With the present types of control valve the temperature of the cooling liquid and its flow are closely controlled and the winter temperature may be predetermined. The valve is balanced in the low pressure side and sufficient leakage is allowed to take care of pressure requirements. Increase in pressure in the system does not in any way affect the operation of the device and a very simple, positive thermostatic control valve is obtained.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a control valve for cooling systems, a valve casing having high and low pressure sides and adapted to be mounted in the system, a double sleeve valve in said casing, said valve having a normal leakage, and a separate thermostatic bellows member attached to and located within the inner sleeve of said valve, said bellows being mounted on the low pressure side.

2. In a control valve for cooling systems, a valve casing adapted to be mounted in said system and having a high and low pressure side, a fixed apertured sleeve in said casing, a movable apertured sleeve in said casing forming a sleeve valve, said two sleeves providing a normal leakage, a thermostatic bellows member mounted in said casing and attached to and located within said movable sleeve, said bellows member being mounted on the low pressure side, and resilient means normally holding said movable sleeve in its normal closed position.

3. In a control valve for cooling systems, a valve casing adapted to be mounted in said system and having a high and low pressure side, a fixed apertured sleeve in said casing, a movable apertured sleeve in said casing forming a sleeve valve, said two sleeves providing a normal leakage, a thermostatic bellows member mounted in said casing and attached to and located within said movable sleeve, said bellows member being mounted on the low pressure side, and a spring mounted on said casing and normally holding said movable sleeve in its closed position and placing such bellows member under a predetermined tension.

4. In a control valve for cooling systems, a valve casing adapted to be mounted in said system and having a high and low pressure side, a fixed apertured sleeve in said casing, a movable apertured sleeve in said casing forming a sleeve valve, said two sleeves providing a normal leakage, a thermostatic bellows member mounted in said casing and attached to and located within said movable sleeve, said bellows member being mounted on the low pressure side, a spring mounted on said casing and normally holding said movable sleeve in its closed position and placing such bellows member under a predetermined tension, and means for adjusting the tension of said spring member.

5. A thermostatic control valve for automobile cooling systems comprising a casing having high and low pressure sides and adapted to be placed in the return water line between the engine and radiator, a fixed apertured sleeve in said casing, a movable apertured sleeve forming a normally leaking sleeve valve, resilient means normally closing said movable sleeve, and a thermostatic bellows member attached to and located within said movable sleeve and adapted to move the same to its open position against the action of such resilient means, said bellows member being mounted on the low pressure side of the water line.

6. A thermostatic control valve for automobile cooling systems comprising a two part casing having high and low pressure sides and adapted to be mounted in the return water line, and thermostatic valve means removably mounted in said casing and comprising a closed bottom fixed valve sleeve having valve ports, a movable ported sleeve mounted within said fixed sleeve, a spring member normally forcing said movable sleeve to its closed position, and an expansible thermostatic bellows member attached to and located within said movable sleeve and adapted to move said valve against said spring action to its open position upon a predetermined rise in temperature of the cooling liquid.

7. Automatic control means for automobile cooling system including the return water line of said system, comprising a valve casing adapted to be mounted in said line, a double sleeve valve mounted in said casing and having a normal leakage and forming a low pressure side to said casing beyond the valve in the direction of water flow, and a thermostatic member mounted in said casing and connected to and located within the inner sleeve of said valve and mounted on the low pressure side of said valve.

8. A flow control device for automobile engine circulating systems adapted to be interposed in said system between the engine and radiator, said device being adapted to be inserted in a conduit constituting a part of said system, and said device being entirely self-contained and comprising a frame provided with an outwardly extending imperforate flange adapted for engagement in said conduit, a temperature responsive element comprising a member secured to said frame, a flow control member comprising a movable element secured to said temperature responsive element and a second flow control element forming a part of said frame and cooperating with said first named control element to close said conduit to the flow of liquid therethrough when said flow control elements are in a predetermined relation, said imperforate flange being disposed at the up stream end of said device and said temperature responsive element being carried substantially co-axially of said conduit in line with the flow of liquid therethrough.

9. A flow control device for automobile engine circulating systems adapted to be interposed in said system between the engine and radiator, said device being adapted to be inserted in a conduit constituting a part of said system and said device being entirely self-contained and comprising a frame provided with an outwardly extending imperforate flange adapted for engagement in said conduit, said frame being arranged substantially coaxially of said conduit in line with the flow of liquid therethrough, a flow control member comprising a cylindrical element forming a part of said frame and a movable element cooperating with the cylindrical wall of said first element to close said conduit to the flow of liquid therethrough, and a temperature responsive element comprising a member secured to said frame and acting against said movable flow control element to open the same, said temperature responsive element being mounted substantially co-axially of said conduit and exposed to the liquid in one end of the device.

10. A flow control device for automobile engine circulating systems adapted to be interposed in said system between the engine and radiator, said device being adapted to be inserted in a conduit constituting a part of said system and said device being entirely self-contained and comprising a frame provided with an outwardly extending imperforate flange adapted for engagement in said conduit, said frame being arranged substantially coaxially of said conduit in line with the flow of liquid therethrough, a flow control member comprising a fixed element forming a part of said frame and a movable element cooperating with said fixed element to close said conduit to the flow of liquid therethrough, and a temperature responsive element comprising a member secured to said frame and acting against said movable flow control element to open the same, said temperature responsive element being substantially cylindrical and being mounted substantially concentrically within said conduit and exposed to the liquid in one end of the device.

Signed by me this 1st day of March, 1923.

JOHN V. O. PALM.